United States Patent
Welle et al.

(10) Patent No.: US 10,704,948 B2
(45) Date of Patent: Jul. 7, 2020

(54) REFLECTION MICROWAVE BARRIER

(71) Applicant: VEGA GRIESHABER KG, Wolfach (DE)

(72) Inventors: Roland Welle, Hausach (DE); Steffen Waelde, Niedereschach (DE); Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 305 days.

(21) Appl. No.: 15/622,399

(22) Filed: Jun. 14, 2017

(65) Prior Publication Data
US 2017/0356787 A1 Dec. 14, 2017

(30) Foreign Application Priority Data
Jun. 14, 2016 (EP) ..................................... 16174419

(51) Int. Cl.
*G01F 23/284* (2006.01)
*G01V 8/00* (2006.01)
(Continued)

(52) U.S. Cl.
CPC ............ *G01F 23/284* (2013.01); *G01S 13/34* (2013.01); *G01S 13/88* (2013.01); *G01V 3/12* (2013.01);
(Continued)

(58) Field of Classification Search
CPC ........ G01F 23/284; G01V 3/12; G01V 8/005; H01Q 15/14; G08B 21/182; G01S 13/88; G01S 13/34
(Continued)

(56) References Cited

U.S. PATENT DOCUMENTS

| | | | |
|---|---|---|---|
| 2005/0044952 A1* | 3/2005 | Schroth | G01F 1/007 73/290 V |
| 2012/0056774 A1* | 3/2012 | Wennerberg | G01F 23/284 342/124 |

FOREIGN PATENT DOCUMENTS

| | | |
|---|---|---|
| CA | 2 325 174 A1 | 6/2001 |
| CA | 2 423 781 | 2/2009 |

(Continued)

OTHER PUBLICATIONS

European Written Opinion, EP16 174 419.8, dated Mar. 16, 2017 (Year: 2017).*

(Continued)

*Primary Examiner* — Frank J McGue
(74) *Attorney, Agent, or Firm* — Oblon, McClelland, Maier & Neustadt, L.L.P.

(57) ABSTRACT

A reflection microwave barrier for monitoring a limit level in at least one working area by outputting a switching signal. The reflection microwave barrier including a microwave transmitter for continuously emitting a time modulated microwave signal, a microwave receiver arranged on the same side of the at least one working area as the microwave transmitter to receive a reflection of the microwave signal, and a control circuitry communicating with the microwave receiver for a detection and monitoring of echo signals in the received reflection of the microwave signal. The control circuitry calculates the runtime of an echo signal), when the amplitude of the echo signal rises or increases. Furthermore, the control circuitry determines by the calculated runtime, whether an origin of the echo signal lies within the at least one working area, and only outputs the switching signal in this case.

18 Claims, 2 Drawing Sheets

(51) Int. Cl.
*G01S 13/88* (2006.01)
*G01S 13/34* (2006.01)
*G01V 3/12* (2006.01)
*G08B 21/18* (2006.01)
*H01Q 15/14* (2006.01)

(52) U.S. Cl.
CPC ........... *G01V 8/005* (2013.01); *G08B 21/182* (2013.01); *H01Q 15/14* (2013.01)

(58) Field of Classification Search
USPC .......................................................... 342/124
See application file for complete search history.

(56) References Cited

FOREIGN PATENT DOCUMENTS

| CN | 1466674 | A | 1/2004 |
|---|---|---|---|
| CN | 1766673 | A | 5/2006 |
| CN | 101087996 | A | 12/2007 |
| CN | 104913830 | A | 9/2015 |
| DE | 33 02 731 | A1 | 8/1984 |
| DE | 20 2005 015 353 | U1 | 2/2006 |
| DE | 10 2013 103 972 | A1 | 10/2014 |
| DE | 20 2014 104 956 | U1 | 2/2016 |
| EP | 0 882 956 | A2 | 12/1998 |
| EP | 1 128 169 | A1 | 8/2001 |

OTHER PUBLICATIONS

Machine Translation of European Written Opinion, EP16 174 419.8, dated Mar. 16, 2017 (Year: 2017).*
Specification of DE202005015353 translated (2006) (Year: 2006).*
Drawings of DE202005015353 (2006) (Year: 2006).*
Office Action dated Mar. 19, 2020 in China Patent Application No. 201710433513.5 (29 pgs.).

* cited by examiner

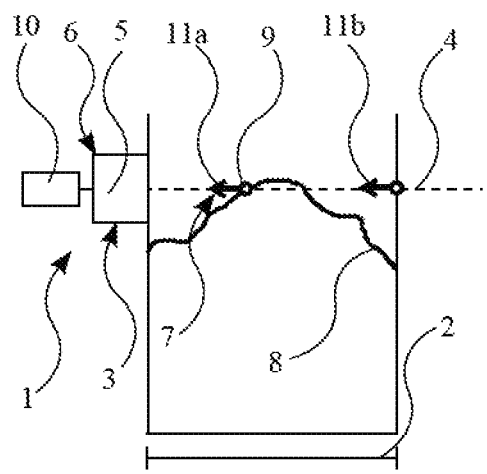
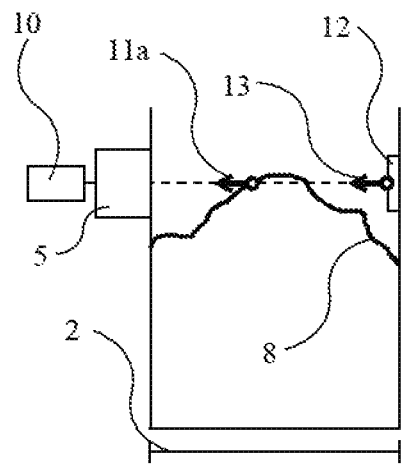
Fig. 1  Fig. 2
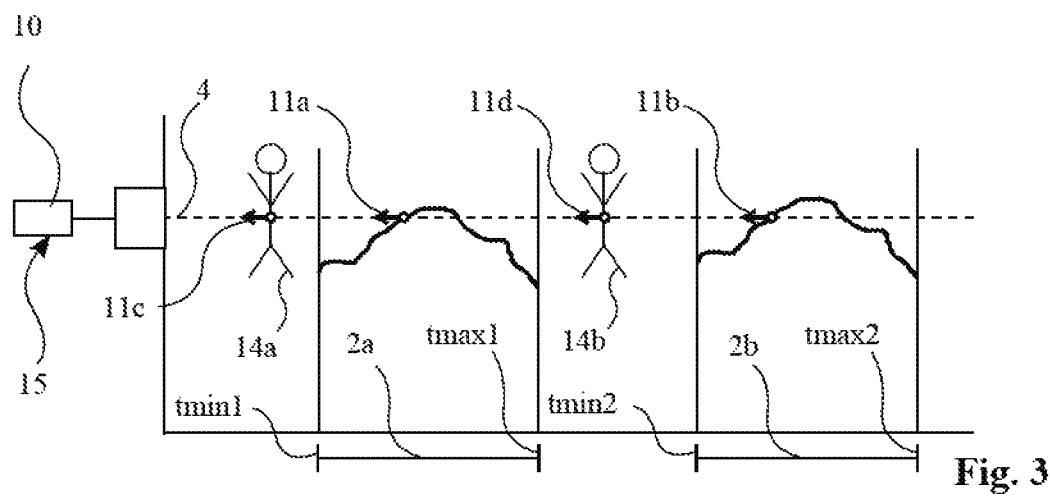
Fig. 3
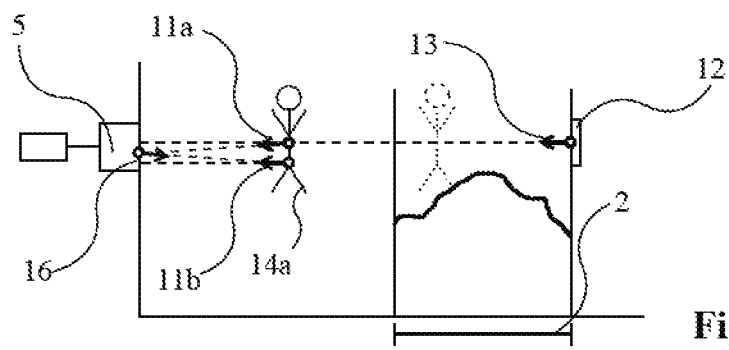
Fig. 4a
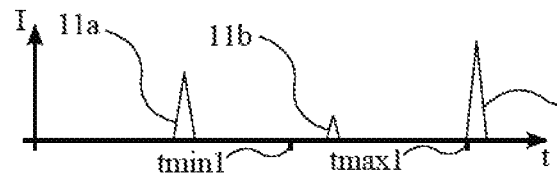
Fig. 4b

REFLECTION MICROWAVE BARRIER

CROSS-REFERENCE TO RELATED APPLICATIONS

This application is based upon and claims the benefit of priority from European Patent Application 16 174 419.8, filed on Jun. 14, 2016, the entire contents of which are incorporated herein by reference.

FIELD OF THE INVENTION

The invention relates to the monitoring of a limit level in at least one working area of a reflection microwave barrier. In particular the invention relates to a reflection microwave barrier for monitoring a limit level in a working area of the reflection microwave barrier, a method for monitoring a limit level in a working area of a microwave barrier, a program element, a computer-readable medium and a use of a reflection microwave barrier in a control center.

BACKGROUND OF THE INVENTION

The basic operating principle of a microwave barrier is known e.g. from DE 33 02 731 A1. A transmitter emits a continuous-wave microwave signal in a direction of an associated receiver. If the direct transmission path from the transmitter to the receiver is interrupted by a target object or by a filling level in a container, this will be recognizable by a missing or a reduced receiving level in the receiver. The decrease of the receiving level is detected within the receiver and is converted into a switching signal. With such a simple arrangement it cannot be prevented e.g. that due to pollution of the microwave transmitter or the microwave receiver a physically not existing target object is detected falsely, because also by pollutions the receiving level, meaning the amplitude of the received microwave signal, can sink. Particularly in industrial applications an accordingly pollution might become unavoidable, e.g. due to dust deposits in machining applications or due to soot deposits in applications with smoke development, by which sometimes considerable process malfunctions are caused.

To avoid such a false detection ("false positive") it is possible e.g. to maintain microwave transmitters and microwave receivers periodically. For example a microwave antenna can be examined by professional personal with a focus on pollution and can be cleaned, if necessary. Also, an automatic cleaning is possible, which may include the use of monitoring means such as cameras, which detect and signalize pollution or other deposits in the area of the microwave transmitter of the microwave receiver.

However, this solution requires additional efforts, either in form of personal or in form of technical devices for detecting and removing of pollutions. Also, both possibilities additionally generate further potential sources of errors. Therefore, a microwave barrier for monitoring a limit level would be desirable, on which pollutions do not have an effect.

SUMMARY OF THE INVENTION

It is an object of the invention to provide a reflection microwave barrier which is to a great extent insensitive towards pollutions of the microwave transmitter and the microwave receiver.

This problem is solved by the subject matter of the independent claims. Embodiments of the invention arise out of the dependent claims and the following description.

A first aspect of the invention relates to a reflection microwave barrier for monitoring a limit level in at least one working area which is assigned to the microwave barrier. Thereby, the limit level is monitored by outputting a switching signal, thus, a switching signal is triggered, if a filling level reaches or exceeds a limit level. Thereby, the filling material can be stored e.g. within a container. A microwave transmitter is provided for continuously emitting a time modulated microwave signal, and a microwave receiver is provided for receiving a reflection of the microwave signal. The transmitter and the receiver can be built in one element, e.g. as a transceiver. The receiver is arranged on the same side of the working area as the microwave transmitter, such that the receiver does not receive the emitted microwave signal directly, but reflections of the microwave signal. A control unit which communicates with the microwave receiver continuously detects and monitors echo signals in the received reflection of the microwave signal. The control unit is, particularly at a rise or an occurrence of the amplitude of the echo signal, e.g. adapted for calculating the runtime of the echo signal, for determining by means of the calculated runtime, whether the origin of the echo signal lies within the at least one working area, and for outputting a switching signal only in this case.

The at least one working area which is assigned to the microwave barrier can particularly extend in a horizontal direction. Correspondingly, the microwave transmitter can be adapted for continuously emitting a time modulated microwave signal in a horizontal direction. Further correspondingly, the microwave receiver can be adapted for receiving a reflection of the microwave signal in a horizontal direction, in particular in the same horizontal direction in which the microwave transmitter emits the time modulated microwave signal.

Usually, filling level measuring devices, in particular their transmitters and receivers, are arranged in a top area of a container, in which a filling level of a filling material has to be measured. Typically, a filling level measuring device is situated in an area of an upper cover of a container. In contrast, a microwave barrier is typically arranged in an area of a sidewall of a container, in which a limit filling level of a filling material has to be monitored. Accordingly, it is preferably intended, that the reflection microwave barrier according to the first aspect of the invention is or can be arranged in a sidewall of a container, in which a limit level or a limit filling level of a filling material shall be monitored. Thereby, the reflection microwave barrier can particularly be arranged in the sidewall of the container in such a way that the microwave transmitter can continuously emit a time modulated microwave signal in a horizontal direction, and that the microwave receiver can receive a reflection of the microwave signal in a horizontal direction.

The described horizontal emitting and receiving thus can be done substantially perpendicular to a change of a vertical filling level of filling material within the container. In other words, the filling level of the filling material within the container typically rises in vertical direction. If the limit level in vertical direction is reached—in this situation filling material is situated within the horizontal working area—a microwave signal, which has been emitted in horizontal direction by the microwave transmitter and which has been time modulated by the microwave transmitter, can be reflected by the filling material being in the horizontal working area, and can be received in horizontal direction by the microwave receiver.

The control unit is alternatively and/or additionally adapted for calculating the runtime of an echo signal, for determining by means of the calculated runtime, whether the origin of the echo signal lies within the at least one working area, and for outputting a switching signal only in this case.

The time modulation of the microwave signal serves to allow a determination of a runtime. Conceivable is for example an amplitude-modulated signal such as a pulse train or a frequency-modulated signal such as an FMCW-signal (Frequency Modulated Continuous Wave).

The term "the reflection of the microwave signal" includes any radiation which is reflected or scattered back in a direction of the microwave receiver. The echo signal serves as a proof for that an obstacle is situated in a direction of propagation of the wave. Based on the properties of the echo signals (strength, phase length, frequency spectrum) properties of the obstacle can be assumed. With the term "the origin of the echo signal" the location is to be understood, where the microwave signal has been reflected. By knowing or by assuming the medium (for example air) along the path of the microwave signal, the running track and thereby the origin can be calculated based on the known runtime of the echo. With "a microwave signal" electromagnetic radiation is meant, preferably with a wavelength in the area between 10 µm to 10 cm.

Inter alia, the reflection microwave barrier provides the advantage, that it is impossible, that the switching signal can be triggered by pollutions, which principally weaken a microwave signal. According to the invention, instead an occurrence or a rise of a microwave signal, namely an echo signal, is chosen as a necessary criterion for outputting the switching signal.

Furthermore, it has to be seen as an advantage, that by the transmitter and the receiver being arranged on the same side, the adjustment of the reflection microwave barrier is simplified, because the transmitter and the receiver do not have to be coordinated at two locations.

Another advantage is that the proposed arrangement does not need a static counter reflector. The reflection of the microwave signal occurs at the target object to be detected or for example at the filling material, when it has reached or for example when it has exceeded the filling level.

According to an embodiment of the invention, the control unit is adapted for determining whether the origin of the echo signal lies within the at least one working area, by checking whether the runtime is larger than at least one predefined minimum runtime.

By this it is achieved, that the working area or originating from the microwave transceiver only starts at a predefined distance along the direction of propagation of the microwave signal. By this, it is possible to ignore foreign objects when identifying target objects or when exceeding a filling level to be monitored, wherein the foreign objects are within this section which is defined by the at least one predefined minimum runtime. These foreign objects can be for example persons, which are moving between a microwave transmitter and a container for filling material, or can exist in form of pollutions in the area of the transmitter or receiver. Classic reflection microwave barriers conversely monitor by the emitting and the receiving of microwave signals a working area which is initially limited only by the power of the microwave. Thereby, it is generally not possible to limit the monitoring only to a sub-area of the distance between the microwave barrier and the reflector.

Moreover, pollutions of the microwave barrier are recognized by echoes in the close range. These echoes can be filtered out and can be removed by using the predefined minimum runtime.

According to another embodiment of the invention the control unit is adapted for determining whether the origin of the echo signal lies within the at least one working area, by checking whether the runtime is smaller than at least one predefined maximum runtime.

By this it is achieved that the working area extends only up to a predefined distance along the direction of propagation of the microwave signal. Thereby, it is possible, to ignore objects, that are behind this distance which is defined by the at least one predefined maximum runtime, when identifying target objects or the filling level. These objects can for example be persons, which are moving behind a container for filling material, or can exist in form of pollutions behind such a container. Classic reflection microwave barriers conversely monitor a working area which is initially limited only by the power of the microwave, wherein it is generally not possible to limit the monitoring only to a sub-area of the distance between the microwave barrier and the reflector.

Thereby, for example, each maximum runtime is associated with a minimum runtime. Thus, one minimum runtime and one maximum runtime associated to the minimum runtime are building one time interval, which corresponds to exactly one spatial working area. If a minimum runtime is chosen to be zero, a testing which is directed to this can be waived, because each runtime must be larger than zero. If there is no routine for testing of a minimum runtime stored within the control unit, this thus equals effectively the testing of a minimum runtime equal to zero.

According to another embodiment of the invention at least two working areas are provided which are separated along a direction of propagation of the microwave signal.

Thereby, each working area is limited by each exactly one minimum runtime and by each exactly one maximum runtime. The minimum runtime can thereby equal to zero. The maximum runtime can equal a distance of a reflector, if present, or can be arbitrarily higher as the minimum runtime. Furthermore, it is possible to provide no maximum runtime for the last working area along the transmitting direction of the microwave transmitter, such that this working area is limited by the power of the microwave radiation. The advantage of the use of at least two working areas can be seen in that it is possible to monitor several working areas, e.g. the inner of spaced apart and behind another rowed containers, by one microwave reflection barrier, and at the same time to ignore areas each lying between the monitored working areas.

According to another embodiment of the invention a user interface for defining the at least one working area is provided.

Thereby it is possible, by means of a user interface to limit the detection area of the microwave barrier. Therefore, the microwave barrier can easily be adapted to new operating conditions. Also, an automatic calculation of favorable minimum runtimes and maximum runtimes is conceivable.

Another embodiment of the invention comprises an immobile reflector for a reflection of the microwave signal as a reflector echo, wherein the control unit is adapted for outputting the switching signal only, if during the occurrence or the rise of the amplitude of the echo signal at the same time the amplitude of the reflector echo sinks and/or the runtime of the reflector echo rises.

Such a reflector (or remote station reflector) can be built by a defined provision of a reflector (for example a corner, a metal plate or the like), or can be implicitly implemented by the existence of an accordingly reflecting surface (for example a machine housing). Thereby, the detection accuracy of the microwave barrier can be further improved. By use of the reflector, the control unit receives an additional signal, namely the reflector echo. The amplitude of the reflector echo sinks, if an object is somewhere along the route from the microwave transmitter to the reflector or between the microwave receiver and the reflector, because this object typically absorbs radiation power. At the same time, typically the runtime of the reflector echo rises, because the object normally comprises a higher refractive index and, thus, allows a slower speed of light as the air or the respective gas arranged otherwise along the route. A switching signal is then only triggered, if during the detection of the new occurring or rising echo signal also the reflector echo loses intensity accordingly, or is shifting backwards, or both. The use of the reflector echoes alone, without a consideration of the echo signal being associated with the object to be detected, could however lead to the false detection, e.g. due to pollutions, known from the state of the art.

This embodiment can be further improved, if the control unit is adapted for identifying the reflector echo during commissioning and for defining the working area as an area between the microwave receiver and the reflector.

Thus, during commissioning it may be provided in an advantage manner that the microwave barrier actively searches for the existence of a remote station reflector. The remote station reflector may be characterized in generating the largest echo at an absence of a detection object. The microwave barrier thereupon by default sets a detection area between $d1=0$ m to $d2=$distance to the remote station reflector as the working area, for example by a definition of the respective minimum runtime and maximum runtime, and switches into a detection modus as described above.

Additionally, it may be provided, that the control unit puts out a warning signal, if the amplitude of the reflector echo sinks under a predefined minimum amplitude of the reflector echo. Also, it may be provided, that a warning signal is only put out, if the runtime of the reflector echo substantially equals a runtime during a commissioning of the microwave barrier.

Thereby, a pollution of the microwave barrier can be distinguished from an object actually being present in the monitoring area in a safe manner.

By this, the reliability can be further enhanced. For example, by the definition of a minimum runtime (also of a minimum distance) it can be reached as described above, that the microwave barrier does not detect any objects in the close range, and erroneously triggers a switching signal. If nevertheless an object is detected in the close range, the microwave barrier can recognize based on the amplitude of the remote station reflector, whether a monitoring of the actual detection area (of the working area) is still possible, or whether the field of view of the microwave barrier is restricted too much by the object in the vicinity area. If a sufficiently safe recognition and monitoring of the remote station reflector as such is no longer possible, a warning message can be emitted by the proposed control unit.

According to an embodiment of the invention, when receiving a first echo signal with a runtime below the at least one minimum runtime and a second echo signal above the at least one minimum runtime the control unit analyzes, whether the second echo signal represents a reflection of the first echo signal, and puts out the switching signal only otherwise.

The advantage is as follows. It is thinkable, that objects in an inactive close range, thus outside the working area, generate such a strong reflection that further echoes arise by a so-called "Ping-Pong" of the microwave signals, and thereby lead to a rise of the amplitude in the active defined detection area (working area). The microwave barrier then would falsely trigger a switching signal in the detection area although there is no object present. Thereby, various detection methods or variants are thinkable:

According to an embodiment it may be intended that an echo apparently being in the detection area is detected based on its distance (N*distance of the echo in the close range). Thus, it is checked, whether the runtime of the second echo signal is an integral multiple of the runtime of the first echo signal.

Furthermore, Ping-Pong-echoes can be detected by assessing the reflection ratios over a certain time period. A simultaneous occurrence of the echoes can indicate a Ping-Pong-ratio.

Also, a detection based on the velocity of the echo signals is thinkable. Thereby it is checked, whether the change of the runtime over time of the second echo signal correlates with the timely changing of the runtime of the first echo signal. For example, an indication of a multiple reflection of the same signal would be that the runtime of an n reflection changes with the n rate of the original echo signal. Therein, this change corresponds to the velocity of an object moving along the direction of propagation of the microwave signal. Additionally, a check of the echo signals with regards to a correlated Doppler shift is thinkable which can indicate a multiple reflection at such a movement.

According to an embodiment it may be intended to detect multiple echoes based on their amplitude. Thereby, it may be checked, whether the amplitude of the second echo signal correlates timely with the amplitude of the first echo signal. Typically, such a correlation would be associated linearly.

The movement of two echoes may also be detected based on a temporarily change of the modulation form (for example saw tooth modulation to triangle modulation).

According to an embodiment it may be intended that the emission characteristic of the microwave transmitter can be switched between at least two profiles and that the control unit is adapted for analyzing, whether the second echo signal represents a reflection of the first echo signal by switching the emission characteristic of the reflection microwave barrier between at least two profiles and by checking, whether a correlation exists between the first echo signal and the second echo signal at the same time.

A switching of the emission characteristic may for example include a change of the amplitude and/or a change of the emission angle and/or a change of the modulation form and/or a change of a polarization and/or a direction of polarization of the microwave signal.

The advantage is that the object causing a Ping-Pong-echo will be illuminated with timely changing intensity by preferably repeated switching of the emission characteristic of the microwave transmitter or the according antenna between different profiles. Then, the multiple reflections of the object—independently from the remaining timely course of the emission characteristic—show a course depending from the number of the multiple reflections but not from the respective emission characteristic. By this, it is possible to separate the Ping-Pong-echoes from one-time echoes. The same can be achieved, if instead of the emission characteristic, thus the spatial intensity distribution of the microwave signal, the modulation form is modified.

A further improvement intends that the control unit is adapted for saving false echoes while commissioning, for subsequently removing the saved false echoes from the reflected microwave signal and/or for taking into account the saved false echoes during a subsequent operating phase when evaluating a reflection of the microwave signal.

The advantage is that it is possible not to take into account points of static reflection at the detection of a switching transition by means of comparing the echoes detected during operation with the echoes of a curve of an interference echo which has been detected previously.

According to an especially emphasized embodiment of the invention it is intended to use the microwave barrier in a control center for a detection of a rail in the at least one working area. Thereby, the microwave signal is emitted horizontally. Here, the described advantages are particularly brought to the fore; for example, it is possible, that personal can move between the rails without triggering a false detection.

Furthermore, the alignment is simplified compared to classic devices in this field of application, in which transmitter and receiver e.g. are constructed oppositely to each other.

In the following, exemplary embodiments of the invention are described with reference to the Figures.

SHORT DESCRIPTION OF THE FIGURES

FIG. 1 shows a reflection microwave barrier according to an embodiment of the invention.

FIG. 2 shows a reflection microwave barrier according to a second embodiment of the invention.

FIG. 3 shows a reflection microwave barrier according to a third embodiment of the invention.

FIG. 4a shows a reflection microwave barrier according to a fourth embodiment of the invention.

FIG. 4b shows a schematic intensity/time diagram of echo signals.

DETAILED DESCRIPTION OF EMBODIMENTS

Figure 5:
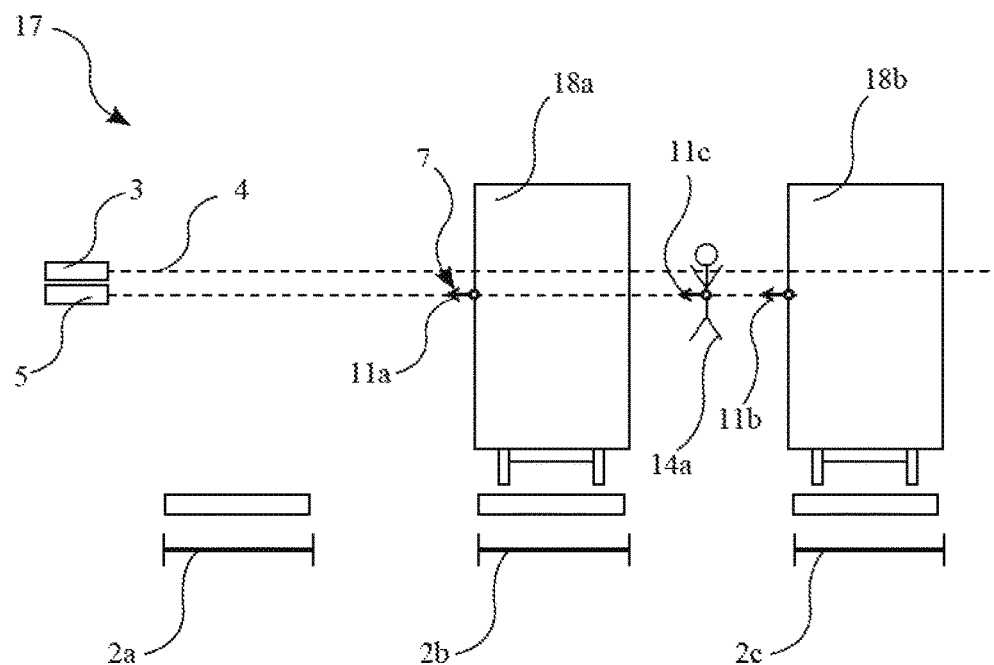
FIG. 5 shows a use of a reflection microwave barrier in a control center.

The representations in the figures are schematic and not drawn to scale.

FIG. 1 shows a reflection microwave barrier 1 according to an embodiment of the invention. The reflection microwave barrier 1 for monitoring a limit level in a working area 2 comprises a microwave transmitter 3 which continuously emits a time modulated, namely a frequency modulated (FMCW) and/or an amplitude modulated and/or a digitally coded microwave signal 4. The microwave transmitter 3 is built as a microwave transceiver 6 in one part with a microwave receiver 5, wherein the microwave receiver 5 receives a reflection 7 of the microwave signal 4. In particular, the microwave receiver 5 is arranged on the same side of the working area 2 which has to be monitored as the microwave transmitter 3.

As soon as a filling material 8, which has to be detected, reaches the height of the limit level, which is to be monitored, the microwave signal 4 is reflected at an origin 9 and is reflected towards the microwave receiver 5.

Furthermore, a control unit 10 communicating with the microwave receiver 5 is intended, wherein the control unit 10 is adapted for a detection and monitoring of echo signals 11a, 11b in the received reflection 7 of the microwave signal 4. If the control unit 10 detects the occurrence or the rise of the amplitude of an echo signal 11a, it calculates the runtime of the echo signal 11a and checks, whether the origin 9 of the echo signal 11a lies within the at least one working area 2. Only in this case the switching signal is put out by the control unit 10, wherein the switching signal indicates that the limit level has been reached or exceeded.

This embodiment in particular does not need a static reflector 12—which is not presented in further detail here—although the microwave transmitter and the microwave receiver are arranged on the same side of the working area, because the filling material 8 has a self-reflecting effect.

The control unit saves false echoes in form of static interference echoes while commissioning, for subsequently removing the saved false echoes from the reflected microwave signal. Thereby, it is e.g. possible to easily ignore the static echo signal 11b of the rear wall of the container containing the filling material 8.

According to FIG. 2 the reflection microwave barrier 1, additionally to the features of the embodiment according to FIG. 1, comprises an immobile reflector 12 for a reflection of the microwave signal 4 as a reflector echo 13. The control unit 10 is adapted for outputting the switching signal—which has to be issued at an occurrence or a rise of the echo signal 11a indicating the reaching of the limit level—only, if during the occurrence or the rise of the amplitude of the echo signal 11a at the same time the amplitude of the reflector echo 13 sinks and/or the runtime of the reflector echo 13 rises. Thereby, advantage is taken of the filling material 8 functioning in various synergistically collaborating ways as a diagnostic, namely on the one hand as a reflector of the echo signal 11a, and on the other hand at the same time as an damper and as a delayer of the reflector echo 13.

Because due to this damping, but also for example due to pollution, the risk exists that a measurable or reasonable interpretable signal no longer arrives at the microwave receiver 5, the control unit 10 is additionally adapted for putting out a warning signal, if the amplitude of the reflector echo 13 sinks under a predefined minimum amplitude.

The control unit 10 is furthermore adapted for automatically identifying the reflector echo during commissioning, e.g. by means of identifying a static echo signal with the highest intensity. The control unit then can, preferably automatically, define the working area 2 as an area between the microwave receiver 5 and the reflector 12.

According to FIG. 3 two working areas 2a, 2b are provided which are separated along a direction of propagation of the microwave signal 4. Thereby, the first working area 2a is defined by a first predefined minimum runtime tmin1 and by a first predefined maximum runtime tmax1 assigned to the first predefined minimum runtime tmin1, and the second working area 2b is defined by a second predefined minimum runtime tmin2 and by a second predefined maximum runtime tmax2 assigned to the second predefined minimum runtime tmin2. The control unit thereby can convert between a runtime and a location assigned to this runtime along the direction of propagation, such that the definition of a runtime is equivalent to the definition of a spatial coordinate. In the chosen presentation, the coordinates are marked which correspond to the respective runtime. When detecting the occurrence or rise of the amplitude of the echo signal 11a, 11b the control unit initially checks, whether the runtime is greater than a predefined minimum runtime tmin1 or tmin2, respectively, and whether the runtime is smaller than a maximum runtime tmax1 or tmax 2, respectively, being assigned to this minimum runtime. Only in such a case the switching signal is emitted. By this, the echo signals 11c, 11d of persons acting as foreign objects 14a, 14b can easily be ignored.

The minimum runtimes tmin1, tmin2 and maximum runtimes tmax1, tmax2 are thereby entered via a user interface 15 and are stored within the control unit 10 for a simplified adaption of the detection routines to the geometry which is prescribed by the containers of the filling materials.

FIG. 4a shows an embodiment of the invention according to which a working area 2 is provided which corresponds to the interval between a minimum runtime tmin1 and the maximum runtime tmax1 assigned to this minimum runtime. FIG. 4b shows a respective intensity/time diagram in which occurring echo signals 11a, 11b and a reflector echo 13 are drawn in schematically.

The maximum runtime tmax1 is predefined by a static reflector 12 which reflects the reflector echo 13. In an area which is to be ignored between a microwave receiver 5 and the minimum distance which corresponds to the minimum runtime tmin1, a foreign object 14a is present which reflects an echo signal 11a to the microwave receiver 5. This signal will not lead to an output of a switching signal, because the runtime of the signal is not greater than the minimum runtime tmin1. However, the echo signal 11a is reflected at a surface 16 in the area of the microwave receiver 5, and is then again reflected from the foreign object 14a to the microwave receiver 5, and is recorded as a "Ping-Pong" echo signal 11b. This "Ping-Pong" echo signal 11b comprises a runtime which lies between the minimum runtime tmin1 and the maximum runtime tmax1 which corresponds to the echo signal of a—virtual, in the shown example presented in dashed lines—foreign object (or a filling material above the limit filling level) within the working area 2, and thus would principally allow the output of a switching signal. However, the control unit—when receiving the first echo signal 11a with a runtime below the at least one minimum runtime tmin1 and a second echo signal 11b above the at least one minimum runtime tmin1—is adapted for analyzing, whether the second echo signal 11b represents a reflection of the first echo signal 11a, and for outputting the switching signal only in the other case. This is done by an analysis of a correlation between the Doppler shifting of both echo signals 11a, 11b and/or between their amplitudes and/or distances which are integer multiples of each another. In the present example, this analysis has a positive outcome, therefore a switching signal is put out.

According to FIG. 5 the reflection microwave barrier 1 according to the present invention is used in a control center 17 for a detection of rail vehicles 18a, 18b. Thereby, the microwave signal 4 is emitted from a microwave transmitter 3 and its reflection 7 containing the echo signals 11a, 11b, 11c is received by the microwave receiver 5. The working areas 2a, 2b, 2c thereby are predefined such that the echo signal 11c of a foreign object 14a cannot be classified as an indicator for a rail vehicle arranged there.

Figure 6:
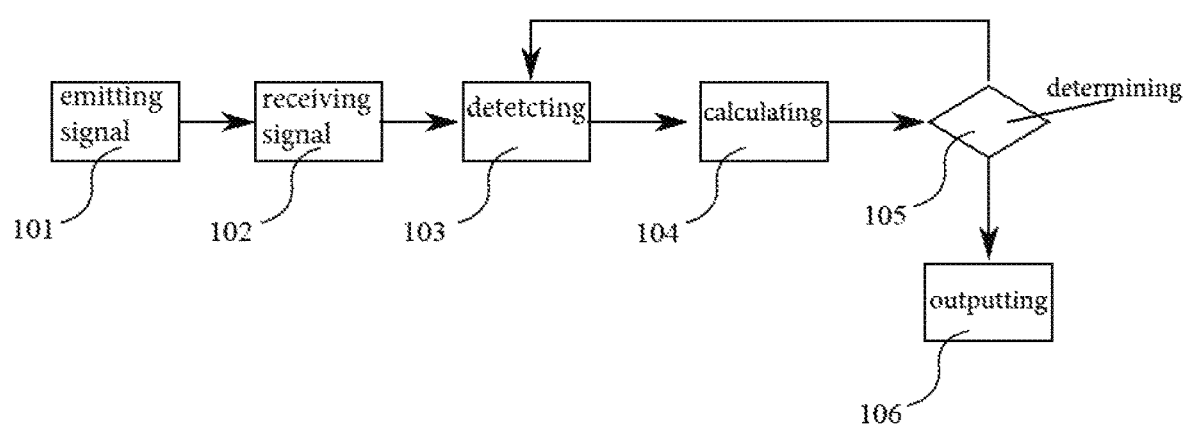
FIG. 6 shows a flow diagram of a method according to an exemplary embodiment of the invention.

FIG. 6 shows a flow diagram of a method for monitoring a limit level according to an embodiment of the invention. In step 101 a time modulated microwave signal is emitted continuously. In step 102 a reflection of the microwave signal is received. In step 103 echo signals—not shown in further detail here—in the received reflection of the microwave signal are detected and monitored. In step 104, when the amplitude of a detected or monitored echo signal occurs or rises, the runtime of the echo signal is calculated. In step 105 by means of the calculated runtime it is determined, whether the echo signal has been reflected within the at least one working area. For this purpose, the runtime is for example compared with a minimum runtime tmin1 or for example with a maximum runtime tmax1. Only in the case that the origin of the echo signal lies within the at least one working area, the switching signal is put out in step 106; otherwise the reflection of the microwave signal is onwards monitored with regards to the occurrence or rise of echo signals according to step 103.

The exemplary embodiments described above are not to be understood as being limitations. There are further embodiments possible, which are captured by the claims hereinafter. For example, it is possible to build the reflection microwave barrier under use of highly integrated MMIC's, wherein in a particular beneficial embodiment the MMIC's also can contain elements for emitting and/or receiving radar signals. For improving the linearity of a MMIC working according to the FMCW-principle, in particular a phase locked loop (PLL) or a fractional-N-PLL can be applied. Furthermore, it may be provided that the reflection microwave barrier is operated by a battery and/or by arrangements for energy harvesting. For this purpose, the microwave barrier may comprise suitable energy management units which can achieve a collection of energy by means of a timely deactivating of the microwave assembly. It is also possible to wirelessly transmit the switching state and/or the change of a switching state to a superior control unit, for example in SPS (e.g. by means of Bluetooth or WLAN or the like). The wireless communication arrangement may further be intended for adjusting the microwave barrier. In addition, it is noted that "comprises" does not exclude other elements or steps, and that the indefinite article "a" does not exclude a multitude. Likewise, it is thinkable, for example when it is referred to the monitoring of echo signals, that only one echo signal is being monitored. Furthermore, it is noted that features or steps, which have been described with reference to one of the above exemplary embodiments, can also be used in a combination with other features or steps of other above described exemplary embodiments. Reference signs in the claims are not to be understood as limitations.

The invention claimed is:

1. A reflection microwave barrier for monitoring a predefined limit of a vertical level of a filling material, wherein the predefined limit is a predefined height of the filling material,
wherein the limit of the filling level is monitored in at least one working area by outputting a switching signal, the reflection microwave barrier comprising:
a microwave transmitter configured to continuously emit a time modulated microwave signal in a direction substantially perpendicular to a direction of change of the vertical filling level;
a microwave receiver arranged on a same side of the at least one working area as the microwave transmitter and configured to receive a reflection of the microwave signal in the direction substantially perpendicular to the direction of change of the vertical filling level so that
a) the reflection of the microwave signal at the vertical filling material occurs when the filling material reaches or exceeds the limit, and
b) the reflection at the filling material does not occur when the filling material does not reach or exceed the limit; and control circuitry configured to communicate with the microwave receiver for detection and monitoring of echo signals in the received reflection of the microwave signal, wherein the control circuitry is further configured to calculate the runtime of an echo signal, wherein the control circuitry is further configured to determine by the calculated runtime, whether an origin of the echo signal lies within the at least one working area, and wherein the control circuitry is further configured to output the switching signal only when it is determined by the control circuitry that the origin of the echo signal lies within the at least one working area.

2. The reflection microwave barrier according to claim 1, wherein the control circuitry is further configured to determine whether the origin of the echo signal lies within the at least one working area, by checking whether a runtime is larger than at least one predefined minimum runtime.

3. The reflection microwave barrier according to claim 2, wherein at least two working areas are provided which are separated along a direction of propagation of the microwave signal.

4. The reflection microwave barrier according to claim 2, wherein when receiving a first echo signal with a runtime below the at least one minimum runtime and a second echo signal above the at least one minimum runtime the control circuitry is further configured to analyze whether the second echo signal represents a reflection of the first echo signal, and otherwise configured to output only the switching signal.

5. The reflection microwave barrier according to claim 4, wherein an emission characteristic of the microwave transmitter is switchable between at least two profiles, and wherein the control circuitry is further configured to analyze whether the second echo signal represents a reflection of the first echo signal, by switching the emission characteristic of the reflection microwave barrier between at least two profiles and by checking whether a correlation exists between the first echo signal and the second echo signal.

6. The reflection microwave barrier according to claim 1, wherein the control circuitry is further configured to determine whether the origin of the echo signal lies within the at least one working area, by checking whether a runtime is smaller than at least one predefined maximum runtime.

7. The reflection microwave barrier according to claim 6, wherein at least two working areas are provided which are separated along a direction of propagation of the microwave signal.

8. The reflection microwave barrier according to claim 1, further comprising a user interface permitting defining of the at least one working area.

9. The reflection microwave barrier according to claim 1, further comprising an immobile reflector configured to reflect the microwave signal as a reflector echo, wherein the control circuitry is further configured to output the switching signal only if, during an occurrence or a rise of an amplitude of the echo signal, an amplitude of the reflector echo sinks and/or the runtime of the reflector echo rises.

10. The reflection microwave barrier according to claim 9, wherein the control circuitry is further configured to identify the reflector echo during commissioning and define the working area as an area between the microwave receiver and the reflector.

11. The reflection microwave barrier according to claim 9, wherein the control circuitry is further configured to output a warning signal when the amplitude of the reflector echo sinks under a predefined minimum amplitude of the reflector echo.

12. The reflection microwave barrier according to claim 1, wherein the control circuitry is further configured to save false echoes while commissioning in order to take into account saved false echoes during a subsequent operating phase when evaluating a reflection of the microwave signal.

13. A control center for a detection of a rail vehicle in at least one working area comprising:

the reflection microwave barrier according to claim 1.

14. The reflection microwave barrier according to claim 1, wherein the reflection microwave barrier is arranged in an area of a sidewall of a container in which the predefined limit of the filling level is monitored.

15. The reflection microwave barrier according to claim 1, wherein the reflection microwave barrier is configured so that the reflection is received in a same direction in which the time modulated microwave signal is emitted.

16. The reflection microwave barrier according to claim 1, wherein the reflection microwave barrier is configured to determine when the echo signal starts to be received or when an amplitude of the received echo signal starts to rise.

17. A method for monitoring a predefined limit of a vertical filling level of a filling material, wherein the predefined limit is a predefined height of the filling material, wherein the limit of the filling level is monitored in at least one working area by outputting a switching signal, comprising:

continuously emitting a time modulated microwave signal in a direction substantially perpendicular to a direction of change of the vertical filling level;

receiving a reflection of the microwave signal in the direction substantially perpendicular to the direction of change of the vertical filling level so that a) the reflection of the microwave signal at the vertical filling material occurs when the filling material reaches or exceeds the limit, and b) the reflection at the filling material does not occur when the filling material does not reach or exceed the limit;

detecting and monitoring echo signals in the received reflection of the microwave signal;

calculating a runtime of an echo signal;

determining, based on the calculated runtime, whether the echo signal has been reflected within the at least one working area; and outputting the switching signal only when it is determined by the determining that the origin of the each signal lies within the at least one working area.

18. A non-transitory computer readable medium that when executed by processing circuitry of a reflection microwave barrier for monitoring a predefined limit of a vertical filling level of a filling material, wherein the predefined limit is a predefined height of the filling material, wherein the limit of the filling level is monitored in at least one working area cause the processing circuitry to implement a method comprising:

continuously emitting a time modulated microwave signal in a direction substantially perpendicular to a direction of change of the vertical filling level;

receiving a reflection of the microwave signal in the direction substantially perpendicular to the direction of change of the vertical filling level so that
a) the reflection of the microwave signal at the vertical filling material occurs when the filling material reaches or exceeds the limit, and
b) the reflection at the filling material does not occur when the filling material does not reach or exceed the limit;
detecting and monitoring echo signals in the received reflection of the microwave signal;
calculating a runtime of an echo signal;
determining, based on the calculated runtime, whether the echo signal has been reflected within the at least one working area; and
outputting the switching signal only when it is determined by the determining that the origin of the each signal lies within the at least one working area.

\* \* \* \* \*